United States Patent
Otake

(10) Patent No.: US 8,199,298 B2
(45) Date of Patent: Jun. 12, 2012

(54) LIQUID CRYSTAL DEVICE, METHOD OF MANUFACTURING THE SAME, AND ELECTRONIC APPARATUS

(75) Inventor: Toshihiro Otake, Suwa (JP)

(73) Assignee: Sony Corporation, Tokyo (JP)

( * ) Notice: Subject to any disclaimer, the term of this patent is extended or adjusted under 35 U.S.C. 154(b) by 302 days.

(21) Appl. No.: 12/104,504

(22) Filed: Apr. 17, 2008

(65) Prior Publication Data
US 2008/0259259 A1    Oct. 23, 2008

(51) Int. Cl.
*G02F 1/1343* (2006.01)
*G02F 1/1335* (2006.01)

(52) U.S. Cl. .................. 349/141; 349/114; 349/117

(58) Field of Classification Search .............. None
See application file for complete search history.

(56) References Cited

U.S. PATENT DOCUMENTS

| | | | | |
|---|---|---|---|---|
| 2004/0136066 A1* | 7/2004 | Kashima | ............ | 359/483 |
| 2005/0195347 A1* | 9/2005 | Wen et al. | ............ | 349/114 |
| 2006/0187388 A1* | 8/2006 | Ohyama et al. | ............ | 349/114 |
| 2007/0002226 A1* | 1/2007 | Sakamoto et al. | ............ | 349/114 |
| 2008/0068543 A1* | 3/2008 | Mitsui et al. | ............ | 349/114 |

FOREIGN PATENT DOCUMENTS

| | | |
|---|---|---|
| JP | 2002-098961 | 4/2002 |
| JP | 2002-107724 | 4/2002 |
| JP | 2003-322857 | 11/2003 |
| JP | 2005-141110 | 6/2005 |
| JP | 2005-338256 | 12/2005 |

OTHER PUBLICATIONS

Japanese Office Action issued Nov. 29, 2011, for corresponding Japanese Appln. No. 2007-110313.

* cited by examiner

*Primary Examiner* — Wen-Ying P Chen
(74) *Attorney, Agent, or Firm* — K&L Gates LLP

(57) ABSTRACT

A liquid crystal device includes a pair of substrates with a liquid crystal layer interposed therebetween. A reflective display region for reflective display and a transmissive display region for transmissive display are provided in a subpixel region. A retardation film is provided in a region of one of the pair of substrates corresponding to the reflective display region. The retardation film is formed by laminating a plurality of liquid crystal material layers with an alignment film interposed therebetween.

10 Claims, 6 Drawing Sheets

LIQUID CRYSTAL DEVICE, METHOD OF MANUFACTURING THE SAME, AND ELECTRONIC APPARATUS

RELATED APPLICATIONS

The present application is based on, and claims priority from, Japanese Application Number 2007-110313, filed Apr. 19, 2007, the disclosure of which is hereby incorporated by reference herein in its entirety.

BACKGROUND

1. Technical Field

The present invention relates to a transflective liquid crystal device that has a retardation film inside a liquid crystal panel, to a method of manufacturing the same, and to an electronic apparatus.

2. Related Art

As a transflective liquid crystal device, there is known a retardation film-equipped liquid crystal device that has a retardation film on an inner surface of a liquid crystal panel. A retardation film is selective provided in a reflective display region, thereby realizing appropriate reflective display and transmissive display. In such a liquid crystal device, since a $\lambda/4$ phase plate does not need to be provided outside a liquid crystal panel. Therefore, it is possible to contribute to reduction in thickness and low cost of a liquid crystal device (for example, see JP-A-2005-338256).

However, when the retardation film is provided on the inner surface of the liquid crystal panel, it is necessary to optimize the cell thickness in consideration of the thickness of the retardation film. A transflective liquid crystal device uses a multi-gap structure, in which the thickness of a liquid crystal layer in a reflective display region is different from the thickness of a liquid crystal layer in a transmissive display region. The retardation (phase difference) of the retardation film is determined by the birefringence $\Delta n$ of a material and the thickness d of the retardation film. Accordingly, if the retardation $\Delta n$ is changed, the thickness d is changed, and thus the multi-gap structure is limited by the thickness d. In this case, the manufacturing process needs to be significantly changed, and there is a risk that display quality is degraded.

The retardation film may be used as a liquid-crystal-layer-thickness adjusting layer (multi-gap structure) that makes the thickness of the liquid crystal layer in the reflective display region and the transmissive display region different. In this case, since the thickness of the retardation film is approximately several μm, when the retardation film is formed by a single coating process, the thickness of the retardation film may not be made uniform. In addition, the retardation film is formed by aligning a liquid crystal material, which is formed on an alignment film, in a predetermined direction during curing. Accordingly, if the thickness of the retardation film becomes larger, the liquid crystal molecules distant from the alignment film may be less sufficiently aligned, and thus precise optical design may not be achieved.

SUMMARY

An advantage of some aspects of the invention is that it provides a liquid crystal device that can form a phase difference excellent in optical characteristics, and a method of manufacturing the same. Another advantage of some aspects of the invention is that it provides an electronic apparatus that includes such a liquid crystal device, thereby realizing excellent display quality.

According to an aspect of the invention, there is provided a liquid crystal device including a pair of substrates with a liquid crystal layer interposed therebetween. A reflective display region for reflective display and a transmissive display region for transmissive display are provided in a subpixel region. A retardation film is provided in a region of one of the pair of substrates corresponding to the reflective display region. The retardation film has a layered structure of a plurality of liquid crystal material layers with an alignment film interposed therebetween. According to this configuration, by adjusting the birefringence $\Delta n$ and the thickness d of each of the plurality of liquid crystal materials, it is possible to form a retardation film having desired phase difference and thickness. According to the aspect of the invention, since the retardation film is formed by multiple coating processes, a retardation film having a uniform thickness can be formed, compared with a case in which a retardation film is formed by a single coating process. In addition, the liquid crystal materials are laminated with the alignment film interposed therebetween. Accordingly, the liquid crystal material that should be aligned by a single alignment film is reduced in thickness, and thus an anchoring force can act on the entire liquid crystal materials. Therefore, according to the aspect of the invention, a phase difference excellent in optical characteristics can be formed at a desired thickness, and a liquid crystal device having excellent display quality can be provided.

The retardation film protrudes toward the liquid crystal layer, and the thickness of the liquid crystal layer in the reflective display region may be smaller than the thickness of the liquid crystal layer in the transmissive display region. With this configuration, a multi-gap structure can be implemented. The retardation film may function as a liquid-crystal-layer-thickness adjusting layer. In the related art, in this case, the retardation film is formed by a single coating process. Accordingly, if the thickness of the retardation film is increased, the thickness of the retardation film may not be made uniform, and the entire retardation film may not be sufficiently aligned. In contrast, according to the aspect of the invention, since the retardation film is formed by multiple coating processes, a liquid-crystal-layer-thickness adjusting layer having a desired thickness can be formed with better uniformity, and optical design of the retardation film can be performed precisely. As a result, a liquid crystal device having excellent display quality can be provided.

At least one liquid crystal material layer among the plurality of liquid crystal material layers may contain a liquid crystal material having a birefringence different from the birefringence of the other liquid crystal material. With this configuration, by appropriately adjusting the birefringence and thickness of each of the liquid crystal materials, the entire retardation film can have desired phase difference and thickness. In this case, the phase difference of the entire of retardation film can be controlled independently of the thickness of the entire of retardation film. Accordingly, even if the phase difference of the entire retardation film is needed to be changed, it is not necessary to change the thickness of the entire retardation film. Therefore, the process does not need to be changed, and stable display quality can be realized with a common process.

Each of the plurality of liquid crystal material layers may contain a liquid crystal material having the same birefringence. With this configuration, since the same liquid crystal material is repeatedly deposited, a retardation film having a uniform thickness can be formed, compared with a case in which a retardation film is formed by a single coating process. In addition, the liquid crystal materials are laminated with an alignment film interposed therebetween. Therefore, a liquid crystal material that should be aligned by a single alignment film can be reduced in thickness, and thus a sufficient anchoring force can act on the entire liquid crystal material.

The thickness of each of the plurality of liquid crystal materials may be 1 μm or less. The retardation film is formed by curing the liquid crystal material while the liquid crystal material is aligned by the alignment film. Accordingly, if the thickness of the retardation film is large, a sufficient anchoring force may not act on the entire retardation film. The thickness is approximately 1 μm. If the thickness of the retardation film is 1 μm or less, the anchoring force of the alignment film can act on the entire retardation film, and thus a retardation film having excellent optical characteristics can be formed.

The alignment direction of each of the plurality of liquid crystal material layers may be in parallel with alignment direction of the other liquid crystal material layer. With this configuration, the optical characteristics of the retardation film can be easily predicted without computer simulation, and an error in design can be reduced.

The retardation film may have a half-wave (λ/2) phase difference, and the liquid crystal layer in a region where the retardation film is formed may have a quarter-wave (λ/4) phase difference. With this configuration, a laminate of the liquid crystal layer and the retardation film can function as a broadband quarter-wave plate. Here, the retardation film has a half-wave phase difference, and hence the thickness of the retardation film is large. For this reason, nonuniformity in the thickness of the retardation film may occur, and the entire retardation film may not be sufficiently aligned. In contrast, according to the aspect of the invention, the retardation film is formed by a plurality of coating processes with an alignment film interposed therebetween. As a result, even if the thickness of the retardation film is large, precise optical design can be performed, and a liquid crystal device having excellent display quality can be provided.

According to another aspect of the invention, there is provided a method of manufacturing a liquid crystal device, which includes a pair of substrates with a liquid crystal layer interposed therebetween, a reflective display region for reflective display and a transmissive display region for transmissive display being provided in a subpixel region, and a retardation film having a layered structure of a plurality of liquid crystal material layers being provided in a region of one of the pair of substrates corresponding to the reflective display region. The process of forming of the retardation film includes forming an alignment film on the one substrate, coating the alignment film with a liquid crystal material, curing the liquid crystal material while the liquid crystal material is aligned by the alignment film to form one of the plurality of liquid crystal material layers, and repeatedly performing the forming of the alignment film, the coating of the alignment film, and the curing of the liquid crystal material multiple times to form the retardation film having the plurality of liquid crystal material layers. With this configuration, by adjusting the birefringence Δn and the thickness d of each of the plurality of liquid crystal materials, a retardation film having desired phase difference and thickness can be formed. According to the aspect of the invention, since the retardation film is formed by multiple coating processes, a retardation film having a uniform thickness can be formed, compared with a case in which a retardation film is formed by a single coating process. In addition, the liquid crystal materials are laminated with the alignment film interposed therebetween. The liquid crystal material that should be aligned by a single alignment film is reduced in thickness, and thus a sufficient anchoring force can act on the entire liquid crystal material.

Therefore, according to the aspect of the invention, a phase difference excellent in optical characteristics can be formed at a desired thickness, and a liquid crystal device having excellent display quality can be provided.

At least one liquid crystal material layer among the plurality of liquid crystal material layers may contain a liquid crystal material having a birefringence different from the birefringence of the other liquid crystal material. With this configuration, by appropriately adjusting the birefringence and thickness of each of the liquid crystal materials, the entire retardation film can have desired phase difference and thickness. In this case, the phase difference of the entire retardation film can be controlled independent of the thickness of the entire retardation film. Accordingly, even if the phase difference of the entire retardation film is needed to be changed, it is not necessary to change the thickness of the entire retardation film. Therefore, the process does not need to be changed, and stable display quality can be realized with a common process.

Each of the plurality of liquid crystal material layers may contain a liquid crystal material having the same birefringence. With this configuration, since the same liquid crystal material is repeatedly deposited, a retardation film having a uniform thickness can be formed, compared with a case in which a retardation film is formed by a single coating process. In addition, the liquid crystal materials are laminated with the alignment film interposed therebetween, a liquid crystal material that should be aligned by a single alignment film can be reduced in thickness, and thus a sufficient anchoring force can act on the entire liquid crystal material.

According to still another aspect of the invention, there is provided an electronic apparatus including the above-described liquid crystal device. With this configuration, an electronic apparatus having excellent display quality can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
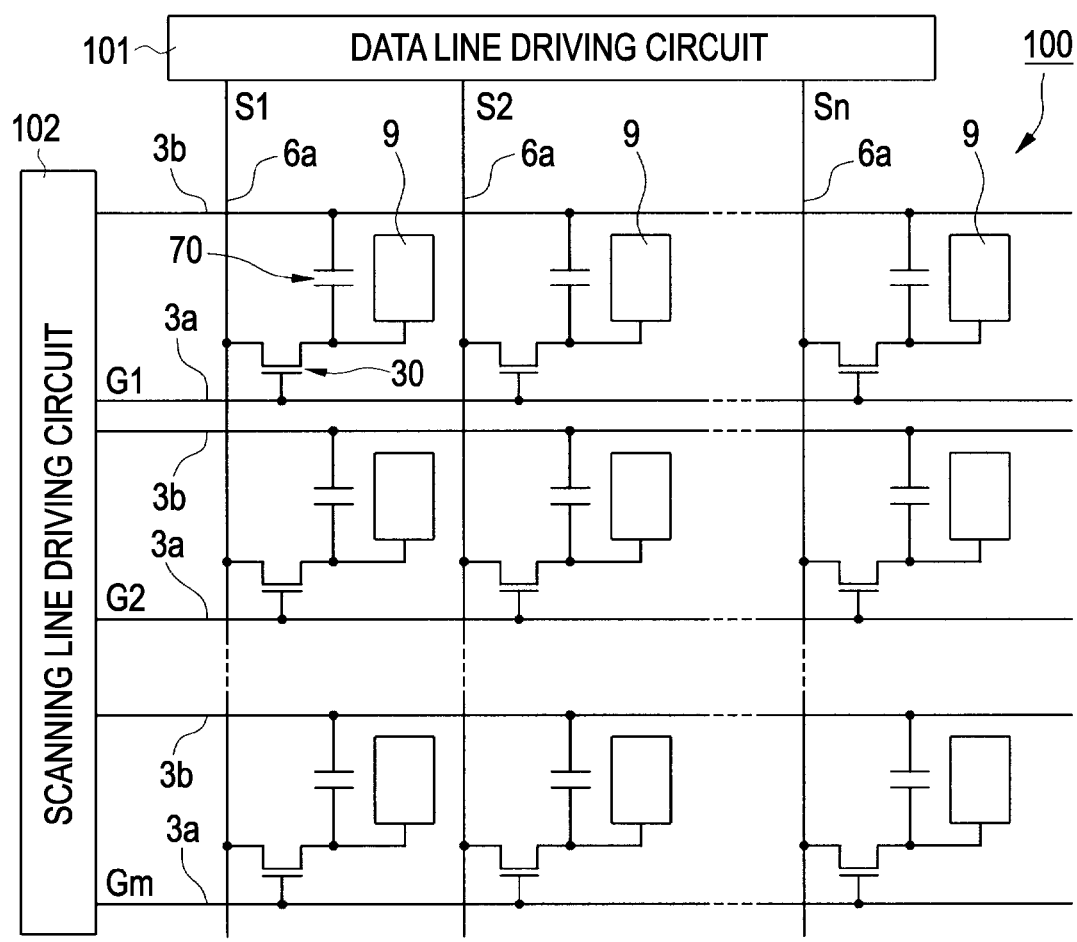
FIG. 1 is an equivalent circuit diagram of a liquid crystal device according to a first embodiment of the invention.

Hereinafter, embodiments of the invention will be described with reference to the drawings. The embodiments are intended to be illustrative, not limiting. In the following embodiments, the forms of members or elements and the combinations thereof are examples, and can be changed in various ways based on design demands without departing from the scope and spirit of the invention. Moreover, in the drawings, for ease of understanding, each structure has been adjusted to be different from the actual structure.

First Embodiment

FIG. 1 is a structural circuit diagram showing a plurality of subpixels formed in a matrix shape in a liquid crystal device 100 according to a first embodiment of the invention. The liquid crystal device 100 of this embodiment is a transverse electric field mode liquid crystal device that performs image display by applying an electric field (transverse electric field) along a surface of a substrate to liquid crystal and performing alignment control, in particular, an FFS (Fringe Field Switching) mode liquid crystal device. In addition, the liquid crystal device 100 is a color liquid crystal device that contains color filters on a substrate, and one pixel includes three subpixels that emit color light components of R (Red), G (Green), and B (Blue), respectively. Therefore, a display region, which is a minimum unit of display, is referred to as 'subpixel region', and a display region having a set of subpixels (R, G, and B) is referred to as 'pixel region'.

As shown in FIG. 1, in each of a plurality of subpixel regions formed in a matrix shape forming an image display region of the liquid crystal device 100, a pixel electrode 9, and a TFT 30, which is electrically connected to the pixel electrode 9 so as to perform switching control of a subpixel, are formed. A data line 6a that extends from a data line driving circuit 101 is electrically connected to a source of the TFT 30. The data line driving circuit 101 correspondingly supplies image signals S1, S2, ..., and Sn to the pixels through the data lines 6a. The image signals S1 to Sn may be linear-sequentially supplied in that order or may be individually supplied to a plurality of adjacent data lines 6a.

A scanning line 3a that extends from a scanning line driving circuit 102 is electrically connected to a gate of the TFT 30. Scanning signals G1, G2, ..., and Gm, which are correspondingly supplied from the scanning line driving circuit 102 to the scanning lines 3a in a pulsed manner with a predetermined timing, are linear-sequentially applied to the gates of the TFTs 30 in that order. The pixel electrode 9 is electrically connected to a drain of the TFT 30. The TFTs 30 serving as switching elements are individually put in the ON state for predetermined periods by the input of the scanning signals G1, G2, ..., and Gm, and then the image signals S1, S2, ..., and Sn, which are supplied from the data lines 6a, are written in the pixel electrodes 9 with a predetermined timing.

The image signals S1, S2, ..., and Sn having predetermined levels written in liquid crystal through the pixel electrodes 9 are held for a predetermined period between the pixel electrode 9 and a common electrode with liquid crystal interposed therebetween. Here, in order to prevent leakage of the held image signals, a storage capacitor 70 is connected in parallel with a liquid crystal capacitor, which is formed between the pixel electrode 9 and the common electrode. The storage capacitor 70 is provided between the drain of the TFT 30 and a capacitor line 3b.

Figure 2:
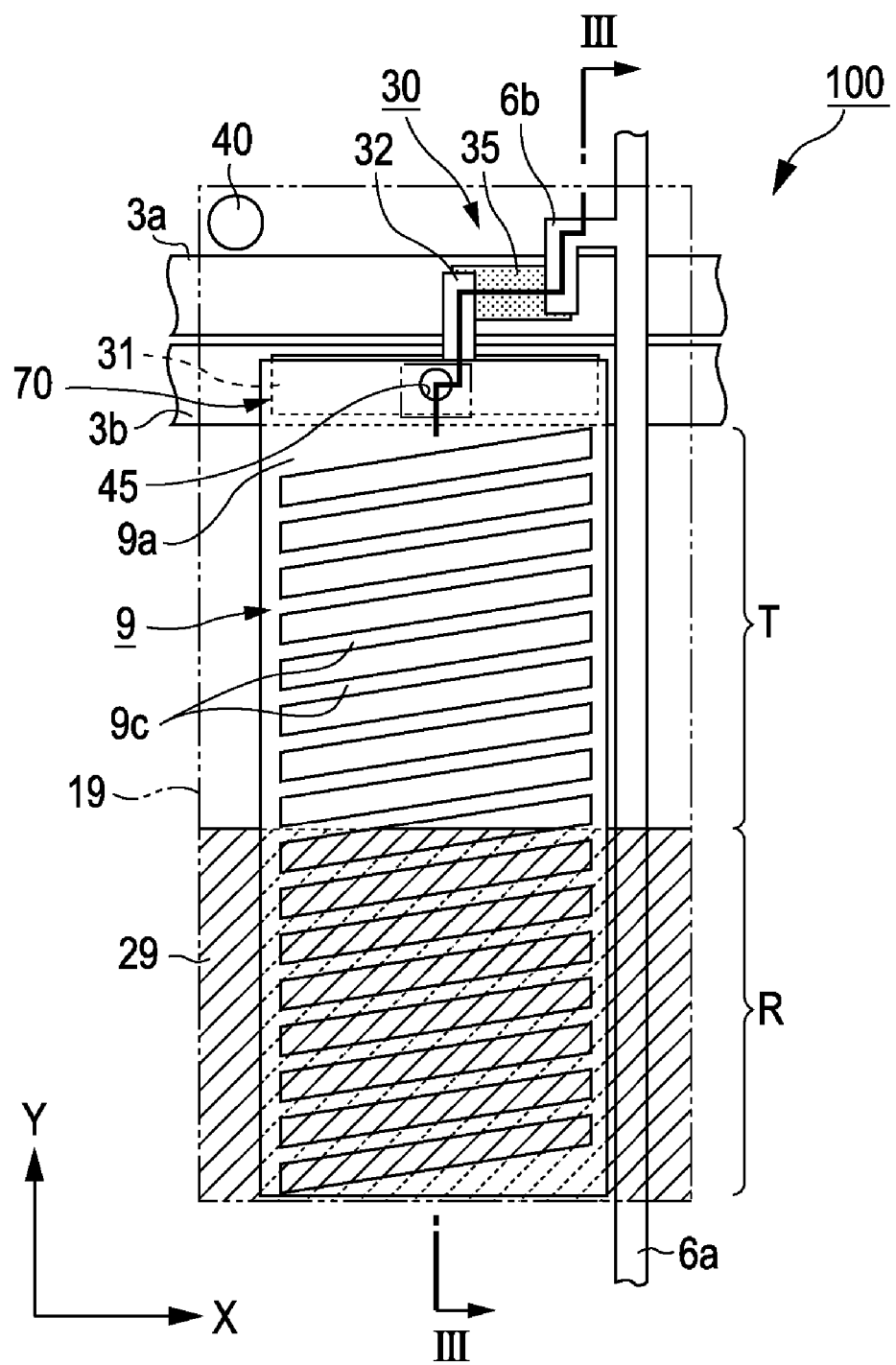
FIG. 2 is a structural plan view of a subpixel in the liquid crystal device.

FIG. 2 is a structural plan view of a subpixel in the liquid crystal device 100. In the subpixel region of the liquid crystal device 100, the pixel electrode (first electrode) 9, which has a ladder shape in plan view and extends in the Y-axis direction, and the flat, substantially uniform common electrode (second electrode) 19 that overlaps the pixel electrode 9 in plan view, are provided. At an upper left corner of the subpixel region (or a gap between the subpixel regions), a columnar spacer 40 is provided upright so as to separate the first substrate 10 and the second substrate 20 by a predetermined gap.

The pixel electrode 9 includes a plurality (15 in the drawing) of strip electrodes 9c that substantially extend in the X-axis direction, and a frame portion 9a that is connected to both ends of the individual strip electrodes 9c in the horizontal direction of the drawing and has a substantially rectangular frame shape in plan view. The plurality of strip electrodes 9c are arranged in parallel with each other in the Y-axis direction at uniform intervals.

The common electrode 19 is formed to cover a reflecting layer 29, which is internally provided in the subpixel region. In this embodiment, the common electrode 19 is a conductive film formed of a transparent conductive material, such as ITO (Indium Tin Oxide), and the reflecting layer 29 is formed of a reflective metal film, such as aluminum or silver, or a dielectric laminated film (dielectric mirror) of dielectric films ($SiO_2$ and $TiO_2$) having different refractive indexes. The liquid crystal device 100 preferably has a function of scattering reflected light from the reflecting layer 29. With this configuration, visibility of reflective display can be improved.

Although the common electrode 19 is formed to cover the reflecting layer 29 in this embodiment, the common electrode 19 may be planarly divided into a transparent electrode formed of a transparent conductive material and a reflecting electrode formed of a reflective metal material. That is, the common electrode 19 may includes a transparent electrode, which is provided to correspond to a transmissive display region, and a reflecting electrode, which is provided to correspond to a reflective display region. Both electrodes may be electrically connected to each other between the transmissive display region and the reflective display region (boundary). In this case, the transparent electrode and the reflecting electrode form the common electrode that generates an electric field together with the pixel electrode 9. The reflecting electrode also functions as a reflecting layer in the subpixel region.

In the subpixel region, the data line 6a, which extends in the X-axis direction, the scanning line 3a, which extends in the Y-axis direction, and the capacitor line 3b, which extends in parallel with the scanning line 3a close to the scanning line 3a, are formed. The TFT 30 is provided in the vicinity of an intersection of the data line 6a and the scanning line 3a. The TFT 30 has an island-shaped semiconductor layer 35, which is formed of amorphous silicon and partially formed in a planar region of the scanning line 3a, and source and drain electrodes 6b and 32, which partially overlap the semiconductor layer 35 in plan view. The scanning line 3a functions as a gate electrode of the TFT 30 at a position where the scanning line 3a overlaps the semiconductor layer 35 in plan view.

The source electrode 6b of the TFT 30 is formed to extend from the data line 6a to the semiconductor layer 35 so as to have a substantially L shape in plan view. The drain electrode 32 extends from the semiconductor layer 35 toward the pixel electrode to be then electrically connected to a capacitor electrode 31 having a substantially rectangular shape in plan view. On the capacitor electrode 31, a contact portion of the pixel electrode 9 is disposed. The capacitor electrode 31 and the pixel electrode 9 are electrically connected to each other through a pixel contact hole 45, which is provided at a position where the capacitor electrode 31 and the pixel electrode 9 overlap each other in plan view. In addition, the capacitor electrode 31 is disposed in a planar region of the capacitor line 3b. The storage capacitor 70 is formed at that position with the capacitor electrode 31 and the capacitor line 3b, which face each other in the thickness direction, as electrodes.

Figure 3:
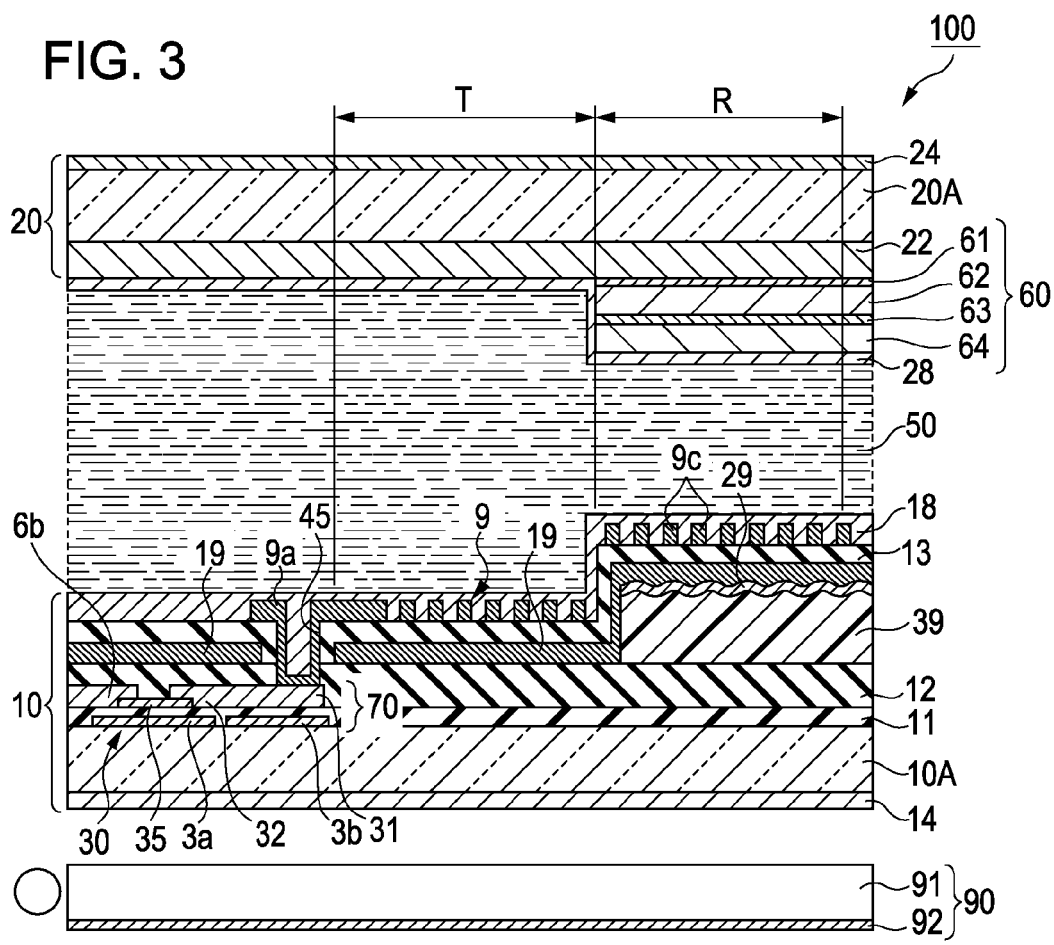
FIG. 3 is a structural cross-sectional view taken along the line III-III of FIG. 2.

FIG. 3 is a partial cross-sectional view taken along the line III-III of FIG. 2. The liquid crystal device 100 includes the first substrate 10 and the second substrate 20, which face each other, with a liquid crystal layer 50 interposed therebetween. The liquid crystal layer 50 is filled between both substrates 10 and 20 by a sealant (not shown), which is provided along the opposing edges of the first substrate 10 and the second substrate 20. A polarizing plate 14 is provided on the outer surface of the first substrate 10 (a side opposite to the liquid crystal layer), and a polarizing plate 24 is provided on the outer surface of the second substrate 20. On the rear surface of the first substrate 10 (the bottom surface in the drawing), a backlight (illumination device) 90 having a light source, a light-guiding plate 91, and a reflecting plate 92 is provided.

The first substrate 10 has a substrate main body 10A formed of glass, quartz, or plastic as a base. On the inner surface of the substrate main body 10A (facing the liquid crystal layer 50), the scanning line 3a and the capacitor line 3b are formed. A gate insulating film 11 is formed to cover the scanning line 3a and the capacitor line 3b. On the gate insulating film 11, the semiconductor layer 35 formed of amorphous silicon is formed, and the source electrode 6b and the drain electrode 32 are formed to partially run onto the semiconductor layer 35. On the right side of the drain electrode 32 in the drawing, the capacitor electrode 31 is integrally formed. The semiconductor layer 35 is disposed to face the scanning line 3a through the gate insulating film 11, and a part of the scanning line 3a in the opposing region forms the gate electrode of the TFT 30. The capacitor electrode 31 is disposed to face the capacitor line 3b through the gate insulating film 11. In the region where the capacitor electrode 31 and the capacitor line 3b face each other, the storage capacitor 70 is formed with the gate insulating film 11 as a dielectric film.

A first interlayer insulating film 12 is formed to cover the semiconductor layer 35, the source electrode 6b, the drain electrode 32, and the capacitor electrode 31. A resin layer 39 formed of acryl resin is formed on a part of the first interlayer insulating film 12, and the reflecting layer 29 is formed on the resin layer 39. The resin layer 39 is provided in a region excluding the transmissive display region T. The resin layer 39 functions as a liquid-crystal-layer-thickness adjusting layer, which makes the thickness of the liquid crystal layer in the transmissive display region T and the thickness of the liquid crystal layer in the reflective display region R different, together with a retardation film 60 described below. The common electrode 19 formed of a transparent conductive material, such as ITO, is formed to cover the reflecting layer 29 and the first interlayer insulating film 12. The resin layer 39 has an uneven surface, and the reflecting layer 29, which has an uneven surface following the uneven surface of the resin layer 39, forms a light-scattering reflecting unit.

As such, in the liquid crystal device 100 of this embodiment, in which the reflecting layer 29 is partially formed in the subpixel region, in a subpixel region shown in FIG. 2, a region where the reflecting layer 29 is formed becomes the reflective display region R where light, which is incident from the outside of the second substrate 20 and passes through the liquid crystal layer 50, is reflected and modulated so as to perform display. In addition, a light-transmissive region outside the region where the reflecting layer 29 is formed becomes the transmissive display region T where light, which is incident from the backlight 90 and passes through the liquid crystal layer 50, is modulated so as to perform display.

A second interlayer insulating film 13, which is formed of silicon oxide, is formed to cover the common electrode 19. The pixel electrode 9, which is formed of a transparent conductive material, such as ITO, is formed on the surface of the second interlayer insulating film 13 facing the liquid crystal layer. In addition, an alignment film 18, which is formed of polyimide, is formed to cover the pixel electrode 9 and the second interlayer insulating film 13.

The pixel contact hole 45 is formed to pass through the first interlayer insulating film 12 and the second interlayer insulating film 13 to reach the capacitor electrode 31. A part (contact portion) of the pixel electrode 9 is buried in the pixel contact hole 45, such that the pixel electrode 9 and the capacitor electrode 31 are electrically connected with each other. An opening is provided in the common electrode 19 to correspond to the region where the pixel contact hole 45 is formed. Through the opening, the pixel electrode 9 and the capacitor electrode 31 are electrically connected with each other, and the common electrode 19 and the pixel electrode 9 are not short-circuited.

The second substrate 20 has a substrate main body 20A formed of glass, quartz, or plastic as a base. On the inner surface of the substrate main body 20A (facing the liquid crystal layer 50), a CF layer 22 having a color filter, which transmits different color light components for every subpixel, is formed. The color filter is preferably divided into two color material regions having different degrees of color within the subpixel. Specifically, a first color material region is provided to correspond to the planar region of the transmissive display region T, and a second color material region is provided to correspond to the planar region of the reflective display region R. In addition, the degree of color of the first color material region can be larger than the degree of color of the second color material region. Furthermore, a non-colored region may be partially provided in the reflective display region R. With this configuration, a difference in the degree of color between the transmissive display region T, in which display light passes through the color filter only once, and the reflective display region R, in which display light passes through the color filter twice, can be prevented. Therefore, display quality can be improved by arranging the appearance of reflective display and transmissive display. Moreover, the CF layer 22 may be formed on the first substrate 10.

On a side of the CF layer 22 facing the liquid crystal layer 50, a retardation film 60 is formed in the reflective display region R, and an alignment film 28 formed of polyimide is formed to cover the retardation film 60 and the CF layer 22. The retardation film 60 includes a plurality of retardation films, for example, a first retardation film 62 and a second retardation film 64. In this embodiment, the optical axis of the first retardation film 62 and the optical axis of the second retardation film 64 are arranged in parallel with each other, and the optical axis of the retardation film 60 is in parallel with the optical axis of the first retardation film 62 and the optical axis of the second retardation film 64. The retardation film 60 is an inner retardation film that is provided on the inner surface of the inner substrate main body 20A so as to apply an approximately half-wave ($\lambda/2$) phase difference to incident light. The first retardation film 62 and the second retardation film 64 are formed by a method that, at first the alignment film is coated with a solution including a liquid crystal material (liquid crystal monomer or liquid crystal oligomer), and then the solution is dried and solidified while the liquid crystal material is aligned in a predetermined direction.

When the birefringence and thickness of the first retardation film 62 are $\Delta n_1$ and $d_1$, and the birefringence and thickness of the second retardation film 64 are $\Delta n_2$ and $d_2$, $\Delta n_1$, $d_1$, $\Delta n_2$, and $d_2$ are set to satisfy Expressions 1 and 2. The first retardation film 62 and the second retardation film 64 are formed by sequentially laminating liquid crystal materials having different birefringence with an alignment film interposed therebetween. For this reason, the birefringence $\Delta n_1$ of the first retardation film 62 and the birefringence $\Delta n_2$ of the second retardation film 64 are different from each other. In the Expressions, N is a desired phase difference of the retardation film 60 determined by design, and D is a desired thickness of the retardation film 60 determined by design.

Expression 1

$$\sum_{i=1}^{2} \Delta n_i d_i = N \quad (1)$$

Expression 2

$$\sum_{i=1}^{2} d_i = D \quad (2)$$

In this embodiment, the retardation film 60 also functions as a liquid-crystal-layer-thickness adjusting layer, which makes the thickness of the liquid crystal layer 50 in the reflective display region R smaller than the thickness of the liquid crystal layer 50 in the transmissive display region T, together with the resin layer 39. In the transflective liquid crystal display, incident light on the reflective display region R passes through the liquid crystal layer 50 twice, while incident light on the transmissive display region T passes through the liquid crystal layer 50 only once. Accordingly, if the retardation of the liquid crystal layer 50 differs between the reflective display region R and the transmissive display region T, a difference in transmittance may occur and thus uniform image display may not be performed. In order to prevent this problem, the retardation film 60 and the resin layer 39 are formed to protrude toward the liquid crystal layer 50, thereby realizing a so-called multi-gap structure. Specifically, the thickness of the liquid crystal layer 50 in the reflective display region R is set to be approximately half of the thickness of the liquid crystal layer 50 in the transmissive display region T, such that the retardation of the liquid crystal layer 50 in the reflective display region R is substantially the same as the retardation of the liquid crystal layer 50 in the transmissive display region T. With this structure, uniform image display can be performed in the reflective display region R and the transmissive display region T.

In this embodiment, the liquid crystal layer 50 is formed of liquid crystal having a positive dielectric anisotropy. In an initial alignment state, in which an electric field is not generated between the pixel electrode 9 and the common electrode 19, the retardation And of the liquid crystal layer 50 in the transmissive display region T applies an approximately half-wave phase difference. In addition, the retardation And of the liquid crystal layer 50 in the reflective display region R applies an approximately quarter-wave (λ/4) phase difference. For this reason, the laminate of the liquid crystal layer 50 and the retardation film 60 functions as a broadband ¼ phase plate. Then, reflectance is lowered over the entire visible light region, and thus achromatic reflective display is performed with low reflectance.

In this embodiment, the retardation film 60 is selectively formed in the reflective display region R. In view of the function as the retardation film, a retardation film that makes a phase difference to transmission light in the transmissive display region T and a phase difference to transmission light in the reflective display region R different may be used. In addition, in view of the function as the liquid-crystal-layer-thickness adjusting layer, a retardation film that protrudes toward the liquid crystal layer 50 in the reflective display region R rather than in the transmissive display region T may be used. Accordingly, a retardation film whose thickness partially varies may be formed on the CF layer 22. That is, a retardation film that has small thickness and phase difference in the transmissive display region T and has large thickness and phase difference in the reflective display region R may be formed.

Figure 4:
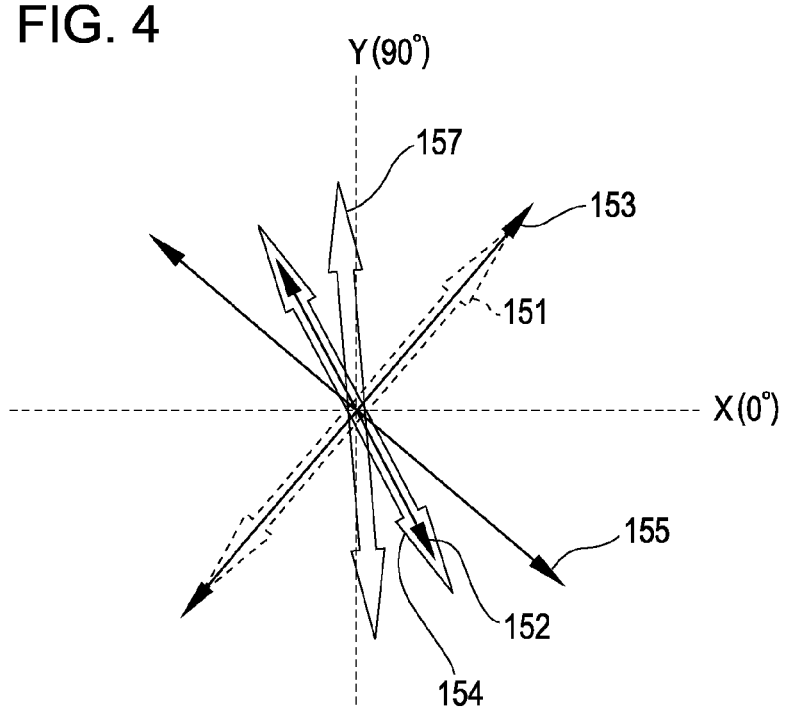
FIG. 4 is an explanatory view illustrating the arrangement of optical axes of optical members in the liquid crystal device.

FIG. 4 is an explanatory view illustrating the arrangement of the optical axes of the individual optical members in the liquid crystal device 100. A transmission axis 153 of the polarizing plate 14 and a transmission axis 155 of the polarizing plate 24 are arranged to be perpendicular to each other. The transmission axis 155 of the polarizing plate 24 is arranged in a direction at 45° with respect to a main direction 157 of an electric field between the pixel electrode and the common electrode (a direction perpendicular to a direction in which the strip electrodes 9c shown in FIG. 2 extend). The optical axis 152 (slow axis) of the first retardation film 62 and the optical axis 154 (slow axis) of the second retardation film 64 are in parallel with each other, and the optical axis 152 of the first retardation film 62 and the optical axis 154 of the second retardation film 64 are arranged in a direction at 22.5° with respect to the transmission axis 155 of the polarizing plate 24. A rubbing direction 151 of the alignment film 18 or 28 is in parallel with the transmission axis 153 of the polarizing plate 14. The rubbing direction 151 of the alignment film 18 or 28 is not limited thereto. What is necessary is that the rubbing direction 151 intersects the main direction 157 of the electric field between the pixel electrode 9 and the common electrode 19. Then, when a voltage is applied between the pixel electrode 9 and the common electrode 19, liquid crystal, which is aligned in parallel along the rubbing direction 151 in the initial state, rotates and is aligned toward the main direction 157 of the electric field. Based on a difference between the initial alignment state and the alignment state when the voltage is applied, bright-dark display is performed.

FIGS. 5A to 5E are explanatory views illustrating a manufacturing method of the liquid crystal device 100. FIGS. 5A to 5E are sectional process views showing a process of forming a retardation film in the liquid crystal device 100. Moreover, known methods can be used for other processes than the process of forming a retardation film. Accordingly, a description will be mainly given laying focus on the process of forming a retardation film, and the detailed descriptions of other processes will be omitted.

In this embodiment, first, the desired phase difference and thickness are calculated by a simulation. Then, if the desired phase difference and thickness can be obtained with a single retardation film, the retardation film 60 is formed with the single retardation film. Meanwhile, if the desired phase difference and thickness cannot be obtained with a single retardation film (liquid crystal material), the retardation film 60 is formed with a plurality of retardation films by a next process. Moreover, the phase difference and thickness of each of the plurality of retardation films are designed according to Expressions 1 and 2.

Figure 5A:
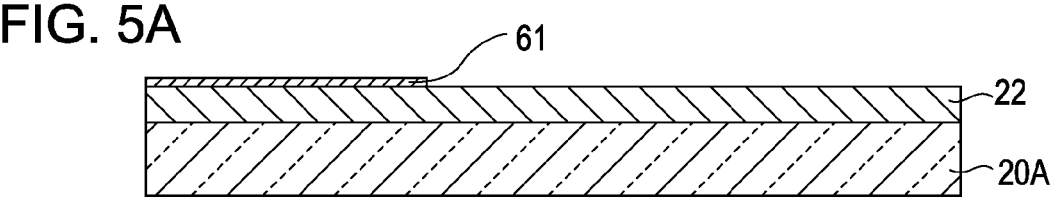
FIGS. 5A to 5E are sectional process views showing a method of manufacturing the liquid crystal device.

First, as shown in FIG. 5A, the substrate main body 20A having the CF layer 22 is coated with a material for an alignment film by a spin coating method or a flexography method. Next, the material for an alignment film is cured. Then, a rubbing treatment is performed, thereby forming a first alignment film 61. A known soluble polyimide solution is used as the material for the alignment film. The first alignment film 61 is formed in at least the reflective display region, but it may be formed on the entire surface of the substrate.

Figure 5B:
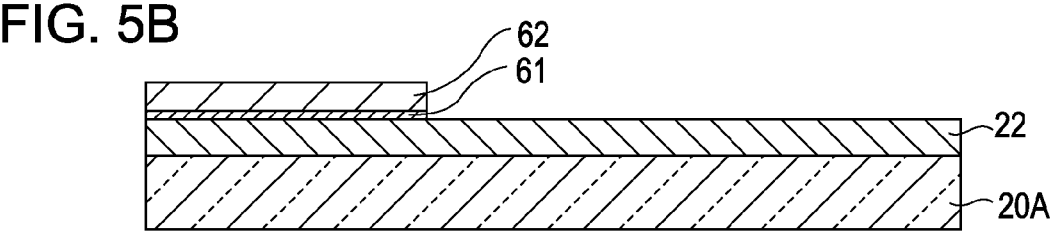

Next, as shown in FIG. 5B, the first alignment film 61 is coated with a photopolymerizable liquid crystal material, and then exposure and development are performed, thereby forming a first retardation film 62. Specifically, a solution of a photopolymerizable liquid crystal material, such as liquid crystal monomer or liquid crystal oligomer, is deposited on the first alignment film 61, temporarily cured to remove a solvent, and heated at a temperature equal to or higher than an isotropic transition temperature (phase transition temperature). Subsequently, the photopolymerizable liquid crystal material is aligned in the rubbing direction of the first alignment film 61 while being gradually cooled. Then, the photopolymerizable liquid crystal material is exposed and polymerized, thereby forming the first retardation film 62. The exposure treatment is performed on the reflective display region. The photopolymerizable liquid crystal material in the transmissive display region where the light for photopolymerization is not irradiated can be removed by an organic solvent.

Figure 5C:
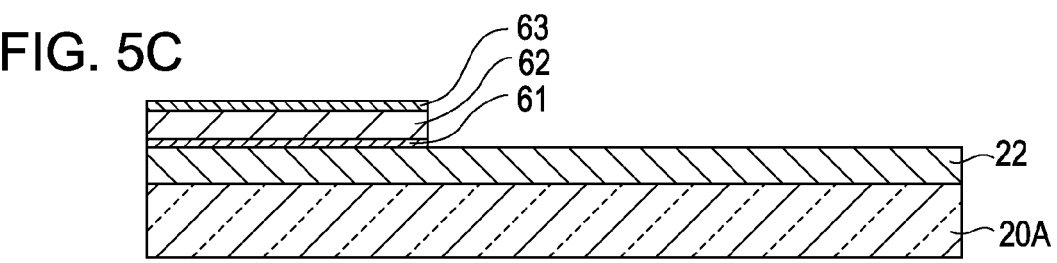

Next, as shown in FIG. 5C, the first retardation film 62 is coated with a material for an alignment film by a spin coating method or a flexography method. Then, the material for an alignment film is cured. Then, a rubbing treatment is performed, thereby forming a second alignment film 63. As the material for the alignment film, a known soluble polyimide solution is used. The second alignment film 63 is formed in at least the reflective display region, but it may be formed on the entire surface of the substrate.

Figure 5D:
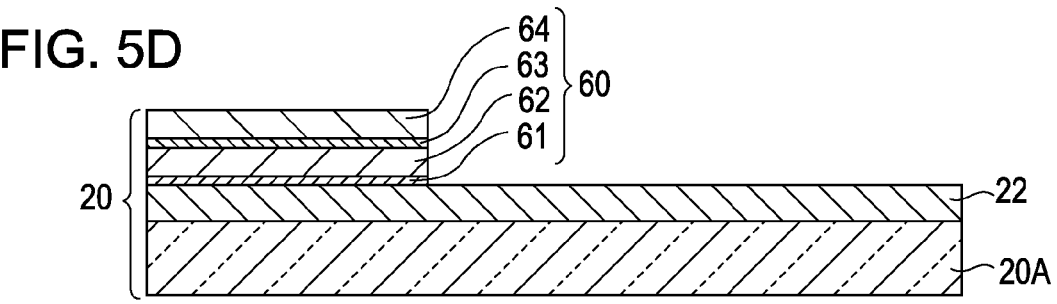

Next, as shown in FIG. 5D, the second alignment film 63 is coated with a photopolymerizable liquid crystal material, and then exposure and development treatments are performed, thereby forming a second retardation film 64. Specifically, a solution of a photopolymerizable liquid crystal material, such as liquid crystal monomer or liquid crystal oligomer, is deposited on the second alignment film 63, temporarily cured to remove solvent, and heated at a temperature equal to or higher than an isotropic transition temperature (phase transition temperature). Subsequently, the photopolymerizable liquid crystal material is aligned along the rubbing direction of the second alignment film 63 while being gradually cooled. Then, the photopolymerizable liquid crystal material is exposed and polymerized, thereby forming the second retardation film 64. The exposure treatment is performed on the reflective display region. The photopolymerizable liquid crystal material in the transmissive display region where the light for photopolymerization is not irradiated can be removed by an organic solvent.

Figure 5E:
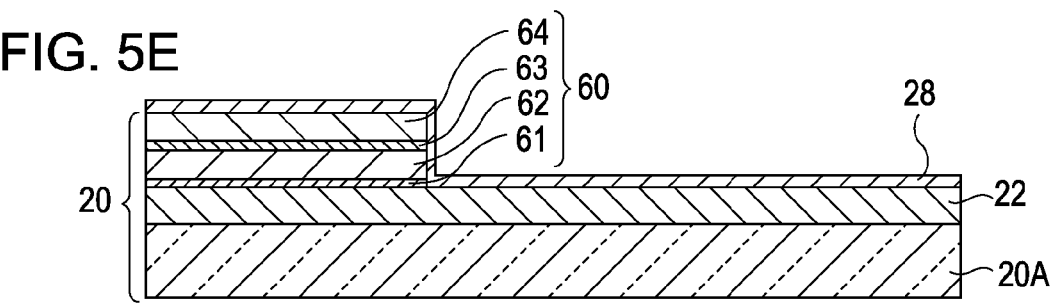

Next, as shown in FIG. 5E, the substrate, on which the second retardation film 64 is formed, is coated with a material for an alignment film by a spin coat method or a flexography method and cured. Then, a rubbing treatment is performed, thereby forming the alignment film 28. A known soluble polyimide solution is used as the material for the alignment film. The alignment film 28 is formed on the entire surface of the display region.

After the second substrate 20 is manufactured in the above-described manner, the first substrate 10, which is manufactured by a known manufacturing method, and the second substrate 20 are bonded to each other with a sealant. Subsequently, a space defined by the first substrate 10, the second substrate 20, and the sealant is filled with liquid crystal, and sealed. In addition, the polarizing plates 14 and 24 are provided on the outer surfaces of the substrate main body 11A and the substrate main body 20A, respectively, and the backlight 90 is provided to face the outer surface of the first substrate 10. In this way, the liquid crystal device 100 according to the above-described embodiment can be manufactured.

The known manufacturing processes may be applied to the process of bonding the first substrate 10 and the second substrate 20 to each other, the process of filling liquid crystal, the process of providing the polarizing plates 14 and 24, and the process of manufacturing the backlight 90. In addition, when the first substrate 10 and the second substrate 20 are bonded to each other, a process may be used that provides liquid crystal on the opposing surfaces of both substrates in advance to thereby fill liquid crystal using a frame-shaped sealant not having a sealing port.

As described above, according to the liquid crystal device 100 of this embodiment, the retardation film 60 is formed with a plurality of retardation films 62 and 64 having different birefringences. Therefore, by appropriately adjusting the birefringence Δn and thickness d of each of the retardation films 62 and 64, the retardation film 60 having desired phase difference N and thickness D can be formed. In this case, even if the phase difference N of the entire retardation film is needed to be changed, it is not necessary to change the thickness D of the entire retardation film. As a result, the process does not need to be changed, and stable display quality can be realized with a common process.

In addition, since the retardation film 60 is formed by multiple coating processes, a retardation film having a uniform thickness can be formed, compared with a case in which a thick retardation film is formed by a single coating process. Furthermore, the first retardation film 62 and the second retardation film 64 are laminated with the first alignment film 61 or the second alignment film 63 interposed therebetween. Therefore, a liquid crystal material that should be aligned by a single alignment film can be reduced in thickness, and thus a sufficient anchoring force can act on the entire retardation film. As a result, precise optical design can be performed, and thus a liquid crystal device having excellent display quality can be provided.

In this embodiment, the retardation film 60 is formed with two liquid crystal material layers. The birefringence of the liquid crystal material of the first retardation film 62 is different from the birefringence of the liquid crystal material of the second retardation film 64. However, the number of liquid crystal material layers forming the retardation film 60 is not limited thereto. For example, the retardation film 60 may be formed with three or more liquid crystal material layers. In this case, the birefringence of the liquid crystal material of each liquid crystal material layer can be different from the birefringence of the other liquid crystal materials. Alternatively, two layers or more among the plurality of layers may have the same birefringence. In this case, the above-described advantages can be obtained insofar as the retardation film satisfies Expressions 1 and 2 as a whole.

Although an FFS mode is used in this embodiment, the above-described configuration can be applied to an IPS (In-Plane Switching) mode, in which liquid crystal is also operated by an electric field along the surface of the substrate. The technical scope of the invention is not limited to a transverse electric field driving mode liquid crystal device, for example, an FFS mode or an IPS mode, but it may be applied to a liquid crystal device, which has TN mode or VAN mode liquid crystal and is provided with a retardation film on a side of a substrate facing a liquid crystal layer.

Second Embodiment

Figure 6:
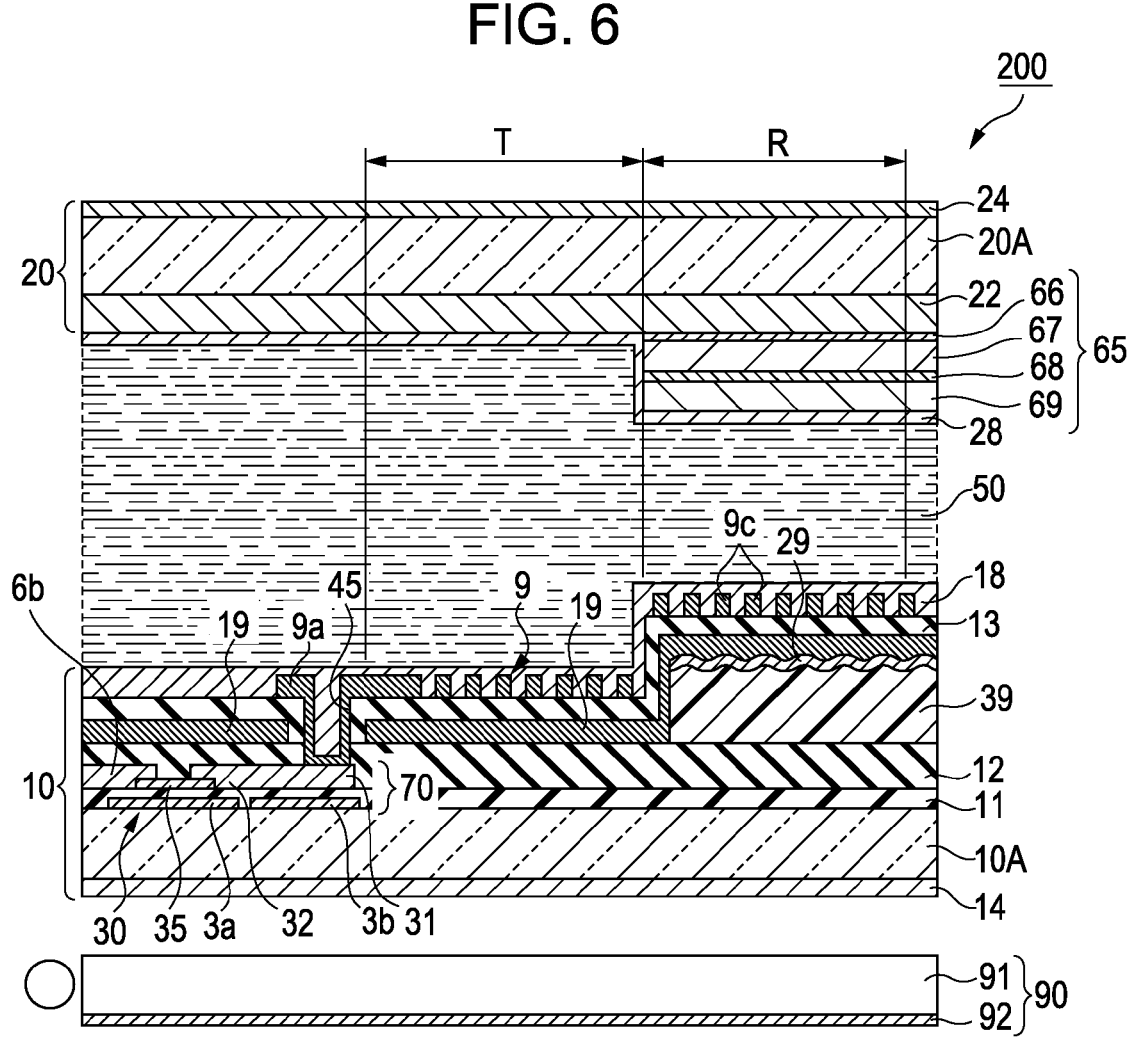
FIG. 6 is a structural cross-sectional view of a liquid crystal device according to a second embodiment of the invention.

FIG. 6 is a structural cross-sectional view of a liquid crystal device 200 according to a second embodiment of the invention. The liquid crystal device 200 has the same basic configuration as the liquid crystal device 100 according to the first embodiment of the invention, except that a retardation film 65 is formed with a plurality of retardation films 67 and 69, each of the retardation film 67 and the retardation film 69 having the same birefringence each other. Here, the same parts as those of the liquid crystal device 100 according to the first embodiment of the invention are represented by the same reference numerals, and the detailed descriptions thereof will be omitted.

On a side of the CF layer 22 facing the liquid crystal layer 50, a retardation film 65 is formed to correspond to the reflective display region R, and an alignment film 28 formed of polyimide is formed to cover the retardation film 65 and the CF layer 22. The retardation film 65 is formed with a plurality of retardation films, including a first retardation film 67 and a second retardation film 69. In this embodiment, the optical axis of the first retardation film 67 and the optical axis of the second retardation film 69 are arranged in parallel with each other, and the optical axis of the retardation film 65 is in parallel with the optical axis of the first retardation film 67 and the optical axis of the second retardation film 69. The retardation film 65 is an inner retardation film that is provided on the inner surface of the substrate main body 20A so as to apply an approximately half-wave (λ/2) phase difference to incident light. The first retardation film 67 and the second retardation film 69 are formed by a method that, at first the alignment film is coated with a solution including a liquid crystal material (liquid crystal monomer or liquid crystal oligomer), and then the solution is dried and solidified while the liquid crystal material is aligned in a predetermined direction.

When the birefringence and thickness of the first retardation film 67 are $\Delta n_1$ and $d_1$, and the birefringence and thickness of the second retardation film 69 are $\Delta n_2$ and $d_2$, $\Delta n_1$, $d_1$, $\Delta n_2$, and $d_2$ are set to satisfy Expressions 3 to 5. The first retardation film 67 and the second retardation film 69 are formed by sequentially laminating liquid crystal materials having the same birefringences with an alignment film interposed therebetween. For this reason, the birefringence $\Delta n_1$ of the first retardation film 67 is the same as the birefringence $\Delta n_2$ of the second retardation film 69. In Expressions, N is a desired phase difference of the retardation film 65 according to design, and D is a desired thickness of the retardation film 65 according to design.

Expression 3

$$\Delta n_i = \Delta n_j (i \neq j)$$

Expression 4

$$\sum_{i=1}^{2} \Delta n_i d_i = N \quad (4)$$

Expression 5

$$\sum_{i=1}^{2} d_i = D \quad (5)$$

In this embodiment, the retardation film 65 also functions as a liquid-crystal-layer-thickness adjusting layer, which makes the thickness of the liquid crystal layer 50 in the reflective display region R smaller than the thickness of the liquid crystal layer 50 in the transmissive display region T, together with the resin layer 39. Specifically, the thickness of the liquid crystal layer 50 in the reflective display region R is set to be approximately half of the thickness of the liquid crystal layer 50 in the transmissive display region T, such that the retardation of the liquid crystal layer 50 in the reflective display region R is substantially the same as the retardation of the liquid crystal layer 50 in the transmissive display region T. With this structure, uniform image display can be performed in the reflective display region R and the transmissive display region T.

In this embodiment, the liquid crystal layer 50 is formed of liquid crystal having a positive dielectric anisotropy. In an initial alignment state, in which a voltage is not applied, the retardation Δnd of the liquid crystal layer 50 in the reflective display region R applies an approximately quarter-wave (λ/4) phase difference. For this reason, the laminate of the liquid crystal layer 50 and the retardation film 65 functions as a broadband ¼ phase plate. Then, reflectance is lowered over the entire visible light region, and thus achromatic reflective display is performed with low reflectance.

The arrangement of the optical axes of the optical members in the liquid crystal device 200 is the same as that in FIG. 4. That is, the transmission axis of the polarizing plate 14 and the transmission axis of the polarizing plate 24 are arranged to be perpendicular to each other. The transmission axis of the polarizing plate 24 is arranged in a direction at 45° with respect to the main direction of the electric field between the pixel electrode and the common electrode (a direction perpendicular to a direction in which the strip electrodes 9c extend). The optical axis (slow axis) of the first retardation film 67 and the optical axis (slow axis) of the second retardation film 69 are in parallel with each other, and the optical axis of the first retardation film 67 and the optical axis of the second retardation film 69 are arranged in a direction at 22.5° with respect to the transmission axis of the polarizing plate 24. The rubbing direction of the alignment film 18 or 28 is in parallel with the transmission axis of the polarizing plate 14. The rubbing direction of the alignment film 18 or 28 is not limited thereto. What is necessary is that the rubbing direction intersects the main direction of the electric field between the pixel electrode 9 and the common electrode 19. Then, when a voltage is applied between the pixel electrode 9 and the common electrode 19, liquid crystal, which is aligned in parallel along the rubbing direction in the initial state, rotates and is aligned toward the main direction of the electric field. Based on a difference between the initial alignment state and the alignment state when the voltage is applied, bright-dark display is performed.

To form the retardation film 65, first, desired phase difference and thickness are calculated by a simulation. When the calculated thickness of the retardation film 65 is larger than 1 μm, the thickness of each liquid crystal material layer is set to be equal to or less than 1 μm. Then, the forming process of the alignment film, the coating process of the alignment film, and the curing process of the liquid crystal material are repeatedly performed multiple times, such that the entire retardation film has a desired thickness. In this way, the retardation film 65 is formed with the plurality of retardation films. The method of forming the retardation film 65 is the same as the method shown in FIGS. 5A to 5E, except that the first retardation film 67 and the second retardation film 69 are formed of the same liquid crystal material.

As described above, according to the liquid crystal device 200 of this embodiment, the retardation film 65 is formed with the plurality of retardation films 67 and 69 having the same birefringence. Therefore, by appropriately adjusting the birefringence Δn and thickness d of each of the retardation films 67 and 69, the retardation film 65 having desired phase difference N and thickness D can be formed.

In addition, since the retardation film 65 is formed by multiple coating processes, a retardation film having a uniform thickness can be formed, compared with a case in which the retardation film is formed by a single coating process.

Furthermore, the first retardation film 67 and the second retardation film 69 are laminated with a first alignment film 66 or a second alignment film 68. Therefore, a liquid crystal material that should be aligned by a single alignment film can be reduced in thickness, and thus a sufficient anchoring force can act on the entire retardation film. As a result, precise optical design can be performed, and thus a liquid crystal device having excellent display quality can be provided.

In this embodiment, the retardation film 65 is formed with two liquid crystal material layers having the same birefringence (the first retardation film 67 and the second retardation film 69). However, the number of liquid crystal material layers forming the retardation film 65 is not limited thereto. For example, the retardation film 65 may be formed with three or more liquid crystal material layers. In this case, the above-described advantages can be obtained insofar as the retardation film satisfies Expressions 4 and 5 as a whole.

Electronic Apparatus

Figure 7:
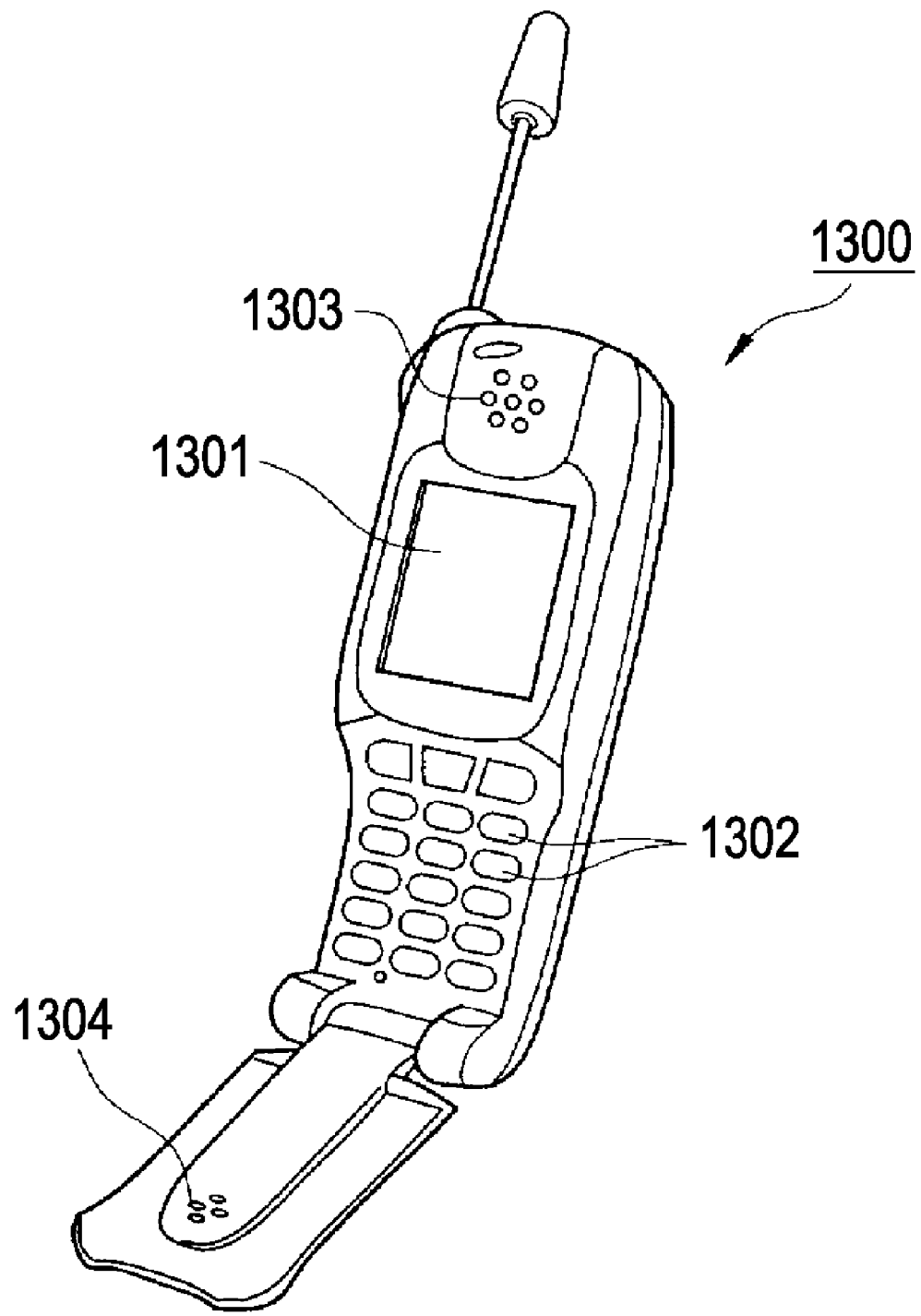
FIG. 7 is a structural schematic view showing the configuration of a cellular phone as an example of an electronic apparatus.

FIG. 7 is a schematic perspective view of a cellular phone as an example of an electronic apparatus according to the invention. A cellular phone 1300 includes the liquid crystal device according to the above-described embodiment as a small display unit 1301. In addition, the cellular phone 1300 includes a plurality of operating buttons 1302, a receiver 1303, and a transmitter 1304. Therefore, it is possible to provide the cellular phone 1300 that includes a display unit having excellent display quality, which is formed with the liquid crystal device according to the above-described embodiment.

The liquid crystal display according to the individual embodiments can be appropriately used as an image display unit of an electronic book, a personal computer, a digital still camera, a liquid crystal television, a view-finder-type or monitor-direct-view-type video tape recorder, a car navigation device, a pager, an electronic organizer, an electronic calculator, a word processor, a workstation, a video phone, a POS terminal, and an apparatus having a touch panel, in addition to the cellular phone. In any electronic apparatus, display can be performed with high contrast and wide viewing angle.

What is claimed is:

1. A liquid crystal device comprising:
   a pair of substrates with a liquid crystal layer interposed therebetween,
   wherein a reflective display region for reflective display and a transmissive display region for transmissive display are provided in a subpixel region,
   a retardation film is provided in a region of a first one of the pair of substrates corresponding to the reflective display region, and a resin layer is provided in a region of a second one of the pair of substrates corresponding to the reflective display region, the retardation film and the resin layer both protruding toward the liquid crystal layer to reduce a thickness of the liquid crystal layer in the reflective display region,
   the retardation film has a layered structure of a plurality of liquid crystal material layers with a first alignment film interposed therebetween, and
   a second alignment film formed on an inner surface of the retardation film and that coats the entire surface of the reflective display region and the transmissive display region,
   wherein alignment directions of each of the plurality of liquid crystal material layers are in parallel with alignment-directions of the other liquid crystal material layer,
   wherein the resin layer has an uneven resin layer surface, and a reflecting layer is formed on the resin layer and has an uneven reflecting layer surface following the uneven surface of the resin layer, and
   wherein a common electrode is provided directly on the uneven reflecting layer surface of the reflecting layer, an interlayer insulating film is provided on the common electrode, and an pixel electrode is provided on the interlayer insulating film, and each of the common electrode, interlayer insulating film and pixel electrode are formed in both the reflective display region and the transmissive display region.

2. The liquid crystal device according to claim 1,
   wherein the retardation film protrudes toward the liquid crystal layer, and
   the thickness of the liquid crystal layer in the reflective display region is smaller than the thickness of the liquid crystal layer in the transmissive display region.

3. The liquid crystal device according to claim 1,
   wherein at least one liquid crystal material layer among the plurality of liquid crystal material layers contains a liquid crystal material having a birefringence different from the birefringence of the other liquid crystal material.

4. The liquid crystal device according to claim 1,
   wherein each of the plurality of liquid crystal material layers contains a liquid crystal material having the same birefringence.

5. The liquid crystal device according to claim 1,
   wherein the retardation film has a half-wave phase difference, and the liquid crystal layer in a region where the retardation film is formed has a quarter-wave phase difference.

6. A method of manufacturing a liquid crystal device, which includes a pair of substrates with a liquid crystal layer interposed therebetween, a reflective display region for reflective display and a transmissive display region for transmissive display being provided in a subpixel region, and a retardation film having a layered structure of a plurality of liquid crystal material layers being provided in a region of a first one of the pair of substrates corresponding to the reflective display region, a second alignment film is formed on an inner surface of the retardation film and that coats the entire surface of the reflective display region and the transmissive display region, and a resin layer is provided in a region of a second one of the pair of substrates corresponding to the reflective display region, the retardation film and the resin layer both protruding toward the liquid crystal layer to reduce a thickness of the liquid crystal layer in the reflective display region,
   wherein the process of foil ing the retardation film includes:
      forming a first alignment film on the one substrate;
      coating the alignment film with a liquid crystal material;
      curing the liquid crystal material while the liquid crystal material is aligned by the alignment film to form one of the plurality of liquid crystal material layers; and
      repeatedly performing the forming of the first alignment film, the coating of first the alignment film, and the curing of the liquid crystal material multiple times to form the retardation film having the plurality of liquid crystal material layers,
   wherein alignment directions of each of the plurality of liquid crystal material layers are in parallel with alignment-directions of the other liquid crystal material layer,
   wherein the resin layer has an uneven resin layer surface, and a reflecting layer is formed on the resin layer and has an uneven reflecting layer surface following the uneven surface of the resin layer, and wherein a common electrode is provided directly on the uneven reflecting layer surface of the reflecting layer, an interlayer insulating film is provided on the common electrode, and an pixel electrode is provided on the interlayer insulating film, and each of the common electrode, interlayer insulating film and pixel electrode are formed in both the reflective display region and the transmissive display region.

7. The method according to claim 6,
wherein at least one liquid crystal material layer among the plurality of liquid crystal material layers contains a liquid crystal material having a birefringence different from the birefringence of the other liquid crystal materials.

8. The method according to claim 6,
wherein each of the plurality of liquid crystal material layers contains a liquid crystal material having the same birefringence.

9. An electronic apparatus comprising the liquid crystal device according to claim 1.

10. A liquid crystal device comprising:
a pair of substrates with a liquid crystal layer interposed therebetween,
wherein a reflective display region for reflective display and a transmissive display region for transmissive display are provided in a subpixel region,
a retardation film is provided in a region of a first one of the pair of substrates corresponding to the reflective display region, and a resin layer is provided in a region of a second one of the pair of substrates corresponding to the reflective display region, the retardation film and the resin layer both protruding toward the liquid crystal layer to reduce a thickness of the liquid crystal layer in the reflective display region, the retardation film has a layered structure of a plurality of liquid crystal material layers with a first alignment film interposed therebetween, and a second alignment film is formed on an inner surface of the retardation film and that coats the entire surface of the reflective display region and the transmissive display region, wherein each of the plurality of liquid crystal material layers contains a liquid crystal material having the same birefringence, wherein the resin layer has an uneven resin layer surface, and a reflecting layer is formed on the resin layer and has an uneven reflecting layer surface following the uneven surface of the resin layer, and wherein a common electrode is provided directly on the uneven reflecting layer surface of the reflecting layer, an interlayer insulating film is provided on the common electrode, and an pixel electrode is provided on the interlayer insulating film, and each of the common electrode, interlayer insulating film and pixel electrode are formed in both the reflective display region and the transmissive display region.

* * * * *

UNITED STATES PATENT AND TRADEMARK OFFICE
CERTIFICATE OF CORRECTION

PATENT NO. : 8,199,298 B2  
APPLICATION NO. : 12/104504  
DATED : June 12, 2012  
INVENTOR(S) : Otake Page 1 of 1

It is certified that error appears in the above-identified patent and that said Letters Patent is hereby corrected as shown below:

On the Title Page, add:

Item [30]

Foreign Application Priority Data  
April 19, 2007 (JP)......................P2007-110313

Signed and Sealed this  
Eighteenth Day of June, 2013

Teresa Stanek Rea  
*Acting Director of the United States Patent and Trademark Office*